United States Patent
Somalingam et al.

(10) Patent No.: US 9,124,715 B2
(45) Date of Patent: Sep. 1, 2015

(54) MOBILE USER APPARATUS AND A MOBILE ACCESSORY APPARATUS FOR THE MOBILE USER APPARATUS

(75) Inventors: Somakanthan Somalingam, Ulm (DE); Ralf Wieser, Beimerstetten (DE)

(73) Assignee: Nokia Technologies Oy, Espoo (FI)

( * ) Notice: Subject to any disclaimer, the term of this patent is extended or adjusted under 35 U.S.C. 154(b) by 183 days.

(21) Appl. No.: 13/048,011

(22) Filed: Mar. 15, 2011

(65) Prior Publication Data

US 2012/0238214 A1    Sep. 20, 2012

(51) Int. Cl.
| | |
|---|---|
| H04B 7/00 | (2006.01) |
| G06F 3/01 | (2006.01) |
| G06F 15/177 | (2006.01) |
| H04M 1/725 | (2006.01) |
| H04B 17/23 | (2015.01) |

(52) U.S. Cl.
CPC ............ *H04M 1/7253* (2013.01); *H04B 17/23* (2015.01)

(58) Field of Classification Search
CPC ......... G06F 3/01; G06F 15/177; G06F 13/00; G09G 5/00; H04B 7/00; G06Q 40/00; G07F 19/00; H04H 60/32; H04N 7/173; H04M 3/42
USPC .......... 455/41.1, 41.2, 41.3, 345, 346, 569.1, 455/84, 556.1, 556.2, 352, 355, 354, 344, 455/569.2, 566; 345/1.3, 31, 33; 348/207.1, 348/376
See application file for complete search history.

(56) References Cited

U.S. PATENT DOCUMENTS

| | | | |
|---|---|---|---|
| 6,850,784 B2 | 2/2005 | SanGiovanni | 455/575.1 |
| 7,696,953 B2 | 4/2010 | Matthews et al. | 345/1.1 |
| 7,697,961 B2 | 4/2010 | Konkka et al. | 455/566 |
| 7,706,850 B2 | 4/2010 | Parivash | 455/575.4 |
| 7,948,450 B2 * | 5/2011 | Kay et al. | 345/1.3 |
| 2004/0185902 A1 | 9/2004 | Yang | 455/557 |

(Continued)

FOREIGN PATENT DOCUMENTS

| | | |
|---|---|---|
| EP | 0 499 565 A2 | 8/1992 |
| EP | 1 635 546 A1 | 3/2006 |

(Continued)

*Primary Examiner* — Edward Urban
*Assistant Examiner* — Ralph H Justus
(74) *Attorney, Agent, or Firm* — Harrington & Smith

(57) ABSTRACT

A mobile user apparatus including: user output circuitry including an integrated display for displaying content to a user; an interface configured to communicate with any of a plurality of accessory apparatus, in possession of different users; and processing circuitry configured to: execute multiple applications at the same time including a first application and a second application; provide output commands of the first application to the integrated display; and provide output commands of the second application to a mobile accessory apparatus in possession of the different user via the interface. A mobile accessory apparatus including an interface configured to communicate with a mobile user apparatus in possession of a different user that is configured to execute multiple applications at the same time including a first application at the mobile user apparatus and a second application, wherein the interface is configured to receive output commands of the second application via the interface; user output circuitry including an integrated display configured to respond to the received output commands of the second application; and user input circuitry configured to provide user input commands to the second application at the mobile user apparatus via the interface.

19 Claims, 4 Drawing Sheets

(56) References Cited

U.S. PATENT DOCUMENTS

| | | |
|---|---|---|
| 2005/0108655 A1 | 5/2005 | Andrea et al. ............... 715/798 |
| 2005/0280524 A1 | 12/2005 | Boone et al. ................ 340/461 |
| 2006/0099995 A1 | 5/2006 | Kim et al. ................... 455/566 |
| 2008/0086370 A1* | 4/2008 | Narayanaswami et al. ..... 705/14 |
| 2008/0114476 A1* | 5/2008 | Kay et al. ...................... 700/90 |
| 2008/0150919 A1* | 6/2008 | Kanamaru .................... 345/179 |
| 2008/0259093 A1 | 10/2008 | Tseng .......................... 345/619 |
| 2008/0273297 A1* | 11/2008 | Kumar .......................... 361/680 |
| 2010/0060549 A1* | 3/2010 | Tsern ............................ 345/2.1 |
| 2010/0060572 A1* | 3/2010 | Tsern ............................ 345/157 |
| 2010/0064228 A1* | 3/2010 | Tsern ............................ 715/740 |
| 2010/0138780 A1* | 6/2010 | Marano et al. ............... 715/804 |
| 2010/0313156 A1 | 12/2010 | Louch et al. ................. 715/769 |
| 2011/0055084 A1* | 3/2011 | Singh ............................. 705/43 |
| 2012/0167126 A1* | 6/2012 | Paek et al. ...................... 725/14 |
| 2012/0190302 A1* | 7/2012 | Reunamaki et al. ......... 455/41.2 |

FOREIGN PATENT DOCUMENTS

| | | |
|---|---|---|
| EP | 2 190 171 A1 | 5/2010 |
| KR | 20100065409 A | 9/2010 |
| KR | 20100009920 | 10/2010 |
| WO | WO 01/22694 A1 | 3/2001 |
| WO | WO 2007/049933 A1 | 5/2007 |
| WO | WO 2009/143294 A2 | 11/2009 |
| WO | WO 2009143294 * | 11/2009 |

* cited by examiner

MOBILE USER APPARATUS AND A MOBILE ACCESSORY APPARATUS FOR THE MOBILE USER APPARATUS

TECHNOLOGICAL FIELD

Embodiments of the present invention relate to a mobile user apparatus and a mobile accessory apparatus for the mobile user apparatus.

BACKGROUND

Mobile user apparatus are now commonly used. Examples include mobile cellular telephones, tablet personal computers etc.

The usability of a mobile user apparatus may be restricted because it is designed for mobility. This may constrain the hardware used in a mobile user apparatus.

BRIEF SUMMARY

According to various, but not necessarily all, embodiments of the invention there is provided a mobile user apparatus comprising: user output circuitry comprising an integrated display for displaying content to a user; an interface configured to communicate with any of a plurality of accessory apparatus, in possession of different users; and processing circuitry configured to:
execute multiple applications at the same time including a first application and a second application;
provide output commands of the first application to the integrated display; and
provide output commands of the second application to a mobile accessory apparatus in possession of the different user via the interface.

According to various, but not necessarily all, embodiments of the invention there is provided a method comprising: executing multiple applications at the same time including a first application and a second application; providing output commands of the first application to an integrated display; and providing output commands of the second application to a mobile accessory apparatus in possession of the different user via an interface configured to communicate with any of a plurality of accessory apparatus.

According to various, but not necessarily all, embodiments of the invention there is provided a mobile accessory apparatus comprising: an interface configured to communicate with a mobile user apparatus in possession of a different user that is configured to execute multiple applications at the same time including a first application at the mobile user apparatus and a second application, wherein the interface is configured to receive output commands of the second application via the interface; user output circuitry comprising an integrated display configured to respond to the received output commands of the second application; and user input circuitry configured to provide user input commands to the second application at the mobile user apparatus via the interface.

According to various, but not necessarily all, embodiments of the invention there is provided a method comprising: at a mobile accessory apparatus, communicating with a mobile user apparatus in possession of a different user that is configured to execute multiple applications at the same time including a first application at the mobile user apparatus and a second application,
at the mobile accessory apparatus, receiving output commands of the second application via an interface; at the mobile accessory apparatus, responding to the received output commands of the second application; and at the mobile accessory apparatus, providing user input commands to the second application at the mobile user apparatus.

According to various, but not necessarily all, embodiments of the invention there is provided a system comprising: a mobile user apparatus in possession of a user; a first accessory apparatus in possession of a first different user; and a second accessory apparatus in possession of a second different user wherein the mobile user apparatus comprises: user output circuitry comprising an integrated display for displaying content to a user; an interface configured to communicate with the first accessory apparatus in possession of the first different user and configured to communicate with the second accessory apparatus in possession of the second different user; processing circuitry configured to:
execute multiple applications at the same time including a first application, a second application and a third application;
provide output commands of the first application to the integrated display; and
provide output commands of the second application to the first accessory apparatus in possession of the first different user via the interface; and
provide output commands of the second application to a second accessory apparatus in possession of the second different user via the interface;
wherein the first mobile accessory apparatus comprises: an interface configured to communicate with the mobile user apparatus and receive output commands of the second application from the mobile user apparatus; user output circuitry comprising an integrated display configured to respond to the received output commands of the second application; and user input circuitry configured to provide user input commands to the second application at the mobile user apparatus via the interface;
wherein the second mobile accessory apparatus comprises: an interface configured to communicate with the mobile user apparatus and receive output commands of the third application from the mobile user apparatus; user output circuitry comprising an integrated display configured to respond to the received output commands of the third application; and user input circuitry configured to provide user input commands to the third application at the mobile user apparatus via the interface.

BRIEF DESCRIPTION

For a better understanding of various examples of embodiments of the present invention reference will now be made by way of example only to the accompanying drawings in which.

DETAILED DESCRIPTION

Figure 1:
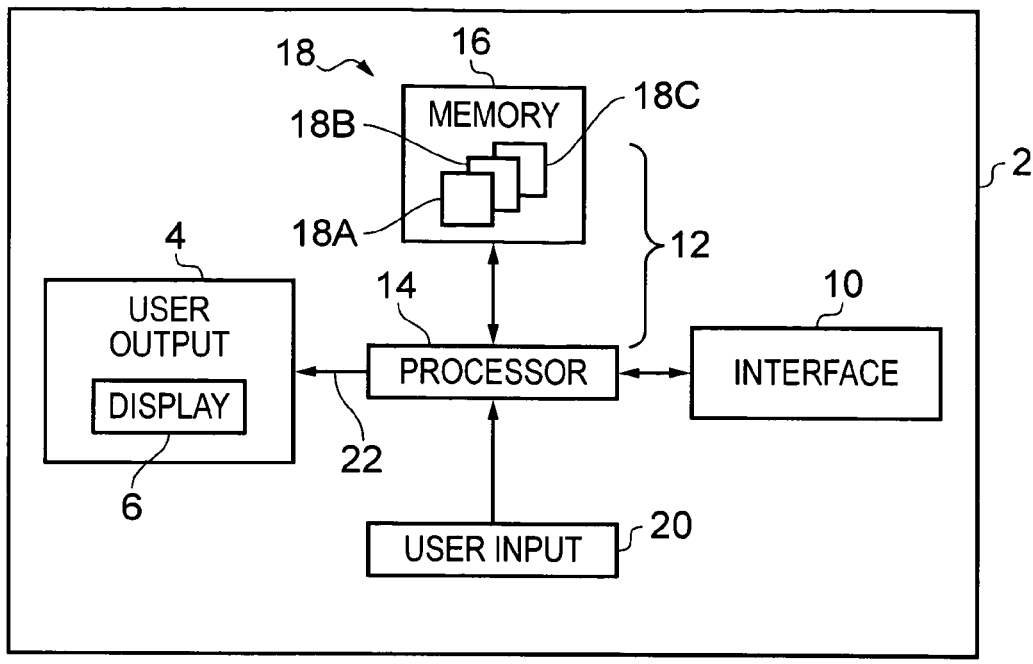
FIG. 1 illustrates an example of a mobile user apparatus.

The Figures illustrate a system 33 comprising: a mobile user apparatus 2 in possession of a user 8; a first accessory apparatus 30A in possession of a first different user 31A; and, optionally, a second accessory apparatus 30B in possession of a second different user 31B.

The mobile user apparatus 2 comprises:
user output circuitry 4 comprising an integrated display 6 for displaying content to the user 8;
an interface 10 configured to communicate with the first accessory apparatus 30A in possession of the first different user 31A and, optionally, configured to communicate with the second accessory apparatus 30B in possession of the second different user 31B;
processing circuitry 12 configured to:
execute multiple applications 18 at the same time including a first application 18A, a second application 18B and, optionally, a third application 18C;
provide output commands 22 of the first application 18A to the integrated display 6;
provide output commands 24 of the second application 18B to the first accessory apparatus 30A in possession of the first different user 31A via the interface 10; and
optionally, provide output commands 24 of the third application 18C to a second accessory apparatus 30B in possession of the second different user 31B via the interface 10.

The first mobile accessory apparatus 30A comprises:
an interface 32 configured to communicate with the mobile user apparatus 2 and receive output commands 24 of the second application 18B from the mobile user apparatus 2;
user output circuitry 34 comprising an integrated display 36 configured to respond to the received output commands 24 of the second application 18B; and
user input circuitry 38 configured to provide user input commands 26 to the second application 18B at the mobile user apparatus 2 via the interface 32.

The optional second mobile accessory apparatus 30B comprises:
an interface 32 configured to communicate with the mobile user apparatus 2 and receive output commands 24 of the third application 18C from the mobile user apparatus 2;
user output circuitry 34 comprising an integrated display 36 configured to respond to the received output commands 24 of the third application 18C; and
user input circuitry 38 configured to provide user input commands 26 to the third application 18C at the mobile user apparatus 2 via the interface 32.

Referring to FIG. 1, there is illustrated a mobile user apparatus 2. The mobile user apparatus 2 may, for example, be a personal user apparatus that a user carries with them. It may be sized so that it is hand-portable, that is, of such dimensions that it can be carried in a palm of the hand or a jacket pocket.

The mobile user apparatus 2 may be a multi-functional apparatus that is configured to provide multiple applications to a user 8 of the mobile user apparatus 2.

The mobile user apparatus 2 may, for example, have telecommunications functionality. It may, for example, be operable as a cellular mobile telephone.

The mobile user apparatus 2 may, for example, provide applications that involve the display of content on a display that varies in time such as satellite navigation functionality, video gaming functionality, photo album functionality, video playback functionality, e-book functionality, multimedia functionality.

The mobile user apparatus 2 comprises: user output circuitry 4; a communications interface 10, processing circuitry 12 and user input circuitry 20.

The user output circuitry 4 comprises an integrated display 6 for displaying content to a user 8. The user output circuitry 4 may, optionally, comprise additional circuitry such as audio output circuitry such as, for example, a loudspeaker or headphone jack or haptic output circuitry such as a vibrator.

The communications interface 10 is configured to communicate with any of a plurality of accessory apparatus 30. Each of the plurality of accessory apparatus 30 may be in possession of a different user 31.

The processing circuitry 12 is configured to execute multiple applications 18 at the same time.

The concurrently executed applications may, for example, including a first application 18A and one or more additional application such as a second application 18B and a third application 18C.

The processing circuitry 12 provides output commands 22 of the first application 18A to the integrated display 6. The processing circuitry 12 is configured to limit control of the first application 18A to control via the user input circuitry 20.

Figure 2A:
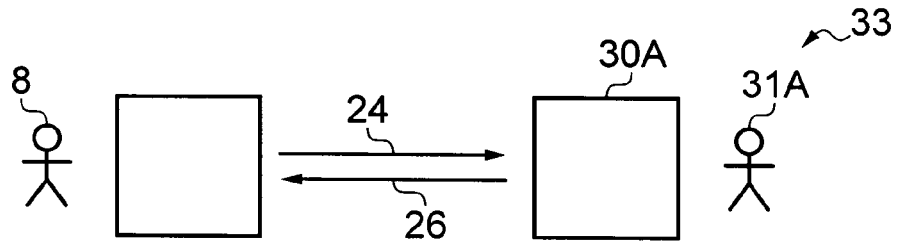
FIG. 2A illustrates an example of a system comprising: a mobile user apparatus in possession of a user and a mobile accessory apparatus in possession of a different user.

The processing circuitry 12, in this example, does not provide output commands 24 of the second application 18B to the integrated display 6 but instead provides, via the communications interface 10, output commands 24 of the second application 18B to a mobile accessory apparatus 30A in possession of the different user 31A. This is illustrated in FIG. 2A.

This enables hardware, such as a display, present in the mobile accessory apparatus 30A to be used to provide the second application to the different user 31A while the mobile user apparatus 2 uses the integrated display 6 to provide the first application 18A to the user 8.

The second application 18B may, for example, be an application for conveying content for consumption by the different user 31A. The content may be time-varying content and it may be streamed via the output commands 24 of the second application 18B. As an example, the second application 18B may provide, at the mobile accessory apparatus 30A satellite navigation functionality, video gaming functionality, photo album functionality, video playback functionality or e-book functionality, multimedia functionality.

The different user 31A may be able to control aspects of the second application 18B while being prevented from controlling aspects of other applications or controlling operation of the mobile user apparatus 2. The processing circuitry 12 may be configured to receive input commands 26 from the mobile accessory apparatus 30A via the communications interface 10 and provide them only to the second application 18B.

Figure 2B:
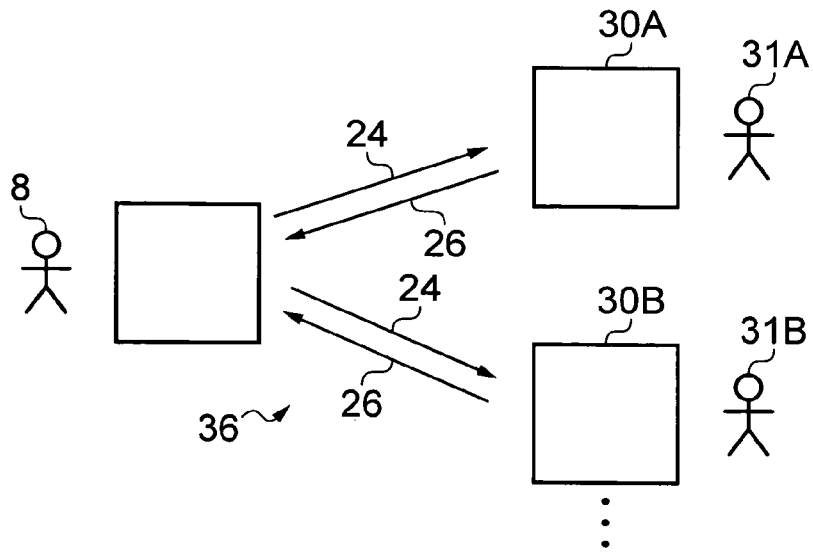
FIG. 2B illustrates an example of a system comprising: a mobile user apparatus in possession of a user, a first accessory apparatus in possession of a first different user; and a second accessory apparatus in possession of a second different user.

If the third application 18C is concurrently executed as well, the processing circuitry 12 may not provide output commands 24 of the third application 18C to the integrated display 6 but may instead provide, via the communications interface 10, output commands 24 of the third application 18C to another accessory apparatus 30B in possession of the different user 31B. This is illustrated in FIG. 2B.

This enables hardware, such as a display, present in the mobile accessory apparatus 30B to be used to provide the third application 18C to the different user 31B while the mobile user apparatus 2 uses the integrated display 6 to provide the first application 18A to the user 8.

The third application 18C may, for example, be an application for conveying content for consumption by the different user 31B. The content may be time-varying content and it may be streamed via the output commands 24 of the third application 18C. As an example, the third application 18C may provide, at the mobile accessory apparatus 30B satellite navigation functionality, video gaming functionality, photo album functionality, video playback functionality or e-book functionality, multimedia functionality. The third application 18C may be the same as or different to the second application 18B.

The different user 31B may be able to control aspects of the third application 18C while being prevented from controlling aspects of other applications or controlling operation of the mobile user apparatus 2. The processing circuitry 12 may be configured to receive input commands 26 from the mobile accessory apparatus 30B via the communications interface 10 and provide them only to the third application 18C.

The processing circuitry 12 may be any type of suitable processing circuitry. It may, for example, be one or more application specific integrated circuits (ASICs) or, as illustrated, it may be a combination of processor 14 and memory 16.

The processor 14 is configured to read from and write to the memory 16. The processor 14 may also comprise an output interface via which data and/or commands are output by the processor 14 and an input interface via which data and/or commands are input to the processor 14.

The memory 16 stores computer programs (applications 18) comprising computer program instructions that control the operation of the apparatus 2 when loaded into the processor 14.

Figure 3:
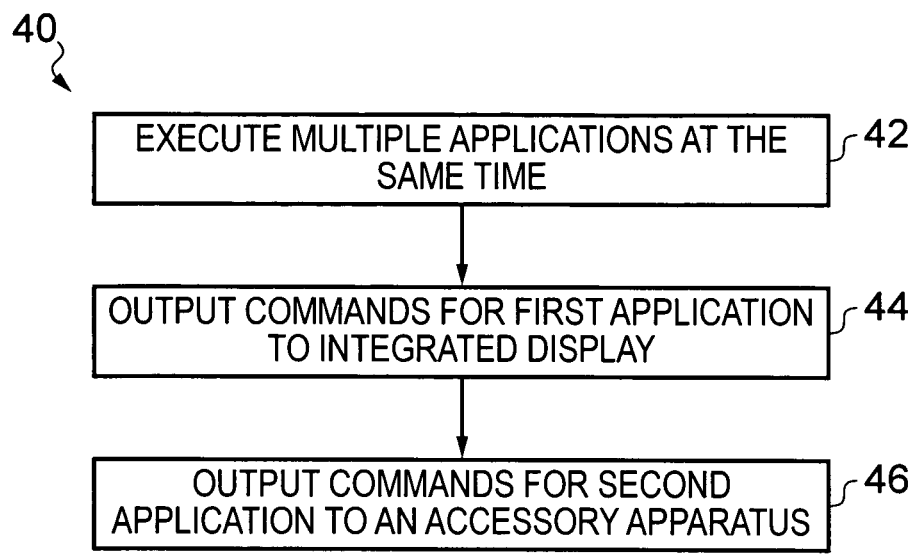
FIG. 3 illustrates a method at a mobile user apparatus.

The computer program instructions of the first application 18A provide the logic and routines that enables the apparatus 2 to perform the method illustrated in FIG. 3. The processor 14 by reading the memory 16 is able to load and execute the computer program 18A.

The apparatus 2 therefore comprises: at least one processor 14; and at least one memory 16 including computer program code 18A the at least one memory 16 and the computer program code 18A configured to, with the at least one processor 14, cause the apparatus 2 at least to perform the method of FIG. 3.

FIG. 3 illustrates a method 40 performed at a mobile user apparatus 2.

At block 42, multiple applications are executed at the same time including a first application 18A, a second application 18B and (optionally) a third application 18C.

At block 44, output commands 22 of the first application 18A are provided to an integrated display 6.

At block 46, output commands 24 of the second application 18B are provided to a mobile accessory apparatus 30A in the possession of the different user 31A via the communications interface 10.

Optionally, at a block not illustrated, output commands 24 of the third application 18C are provided to a mobile accessory apparatus 30B in the possession of the different user 31B via the communications interface 10.

The computer programs 18A, 18B, 18C may arrive at the apparatus 2 via any suitable delivery mechanism. The delivery mechanism may be, for example, a computer-readable storage medium, a computer program product, a memory device, a record medium such as a compact disc read-only memory (CD-ROM) or digital versatile disc (DVD), an article of manufacture that tangibly embodies the computer program. The delivery mechanism may be a signal configured to reliably transfer the computer program.

Although the memory 16 is illustrated as a single component it may be implemented as one or more separate components some or all of which may be integrated/removable and/or may provide permanent/semi-permanent/dynamic/cached storage.

The communications interface 10 may be configured to operate as a standardized interface. It may, for example, provide the output commands 24 to a mobile accessory apparatus 30 in a standard format that is common to a plurality of different accessory apparatus 30. It may, for example, receive input commands 26 from a mobile accessory apparatus 30 in a standard format that is common to a plurality of different accessory apparatus 30. This enables the mobile user apparatus 2 to be used with different accessory apparatus 30, which may be made by different manufacturers.

The communications interface 10 may be, for example, a wireless interface for local wireless communication. The wireless interface may, for example, comprise a radio transceiver that operates in the industrial, scientific and medical (ISM) radio bands (2.4 GHz) with a short range (less than 100 m).

Examples of suitable communication interfaces 10 include wired and wireless interfaces. For example, local area network (LAN), universal serial bus (USB), wireless universal serial bus (WUSB), Bluetooth, wireless local area network (WLAN), ZigBee etc.

Figure 4:
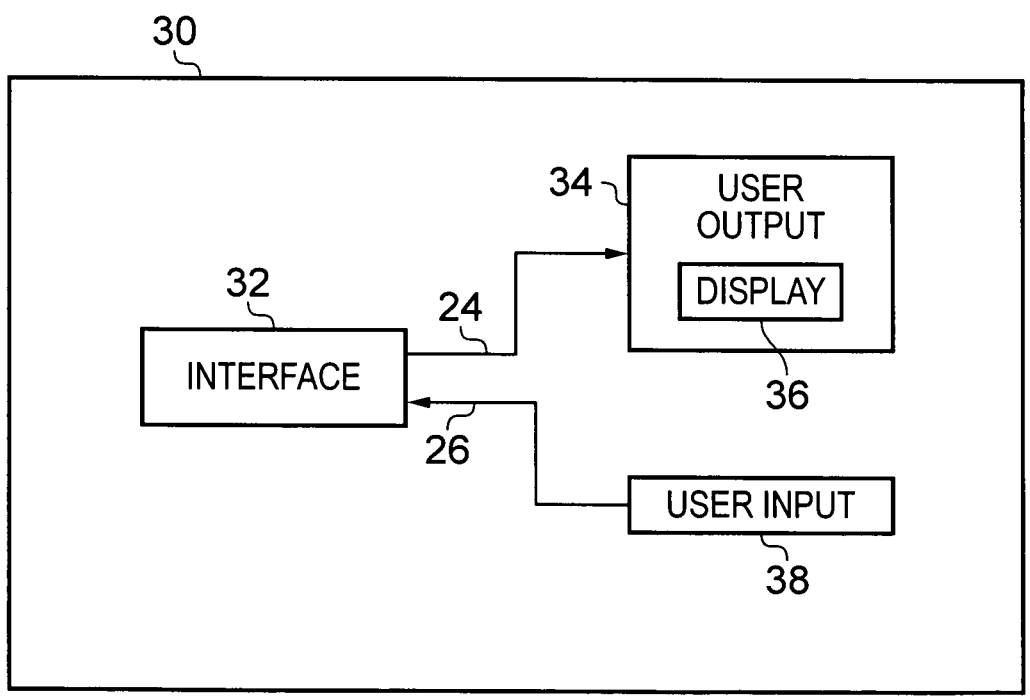
FIG. 4 illustrates an example of a mobile accessory apparatus.

FIG. 4 illustrates an example of a mobile accessory apparatus 30. In this example, the mobile accessory apparatus 30 comprises hardware e.g. a display that augments the hardware of the mobile user apparatus 2 and which can be used by a different person to the person using the mobile user apparatus 2. The functionality of the mobile user apparatus 2 can therefore be extended to one or more additional persons 31 each of whom has a mobile accessory apparatus 30 that communicates with the mobile user apparatus 2.

The mobile accessory apparatus 30 is described as an 'accessory' apparatus as it relies entirely or predominantly on a communicating mobile user apparatus 2 to realize its potential as an output and input apparatus.

The mobile accessory apparatus 30 comprises: a communications interface 32, user output circuitry 34 comprising an integrated display 36 and user input circuitry 38.

The communications interface 32 is configured to communicate with a communications interface 10 of a mobile user apparatus 2.

The mobile user apparatus 2 executes multiple applications 18 at the same time and provides output commands 34 from such an application (the second application 18B in this example) to the mobile accessory apparatus 30 via the communications interface 32.

The user output circuitry 34 receives the output commands 24. At least the display 36 is configured to respond to the received output commands 24 of the second application 18B.

The user input circuitry 38 is configured to provide user input commands 26 to the second application 18B at the mobile user apparatus 2 via the communications interface 26. The user input circuitry 38 may be limited to provide user input commands 26 for only the application at the mobile user apparatus that is providing the received output commands 24.

The mobile accessory apparatus 30 may have no independent operability. It may operate only or predominantly as a consequence of communication with a mobile user apparatus 2. For example, the mobile accessory apparatus 30 may have no independent operability and may operate only while in communication with a mobile user apparatus 2. Continuing this example, the mobile accessory apparatus 30 may provide output relating to the second application 18B only while in communication with a mobile user apparatus 2 executing the second application 18B.

The mobile accessory apparatus 30 is configured to operate with a plurality of mobile user apparatus 2 and is not restricted to operate with a particular mobile user apparatus 2.

The mobile accessory apparatus 30 has limited processing capability compared to the mobile user apparatus 2. The mobile accessory apparatus 30 may operate as a slave to the master mobile user apparatus 2.

For example, the mobile accessory apparatus 30 may not execute applications and/or may not perform data processing such as, for example, decoding.

The mobile accessory apparatus 30 may not comprise processing circuitry and may be without a programmable processor. The mobile accessory apparatus 30 may be a hardware device without programmability.

The communications interface 32 may be configured to operate as a standardized interface. It may, for example, provide the input commands 26 to a mobile user apparatus 2 in a standard format that is common to a plurality of different mobile user apparatus 2. It may, for example, receive the output commands 24 in a standard format that is common to a plurality of different mobile user apparatus 2. This enables the mobile accessory apparatus 30 to be used with different mobile user apparatus 2, which may be made by different manufacturers.

The communications interface 32 may be, for example, a wireless interface for local wireless communication. The wireless interface may comprise a radio transceiver that operates in the industrial, scientific and medical (ISM) radio bands (2.4 GHz) with a short range (less than 100 m).

Examples of suitable communication interfaces include wired and wireless interfaces. For example, local area network (LAN), universal serial bus (USB), wireless universal serial bus (WUSB), Bluetooth, wireless local area network (WLAN), ZigBee etc.

Figure 5:
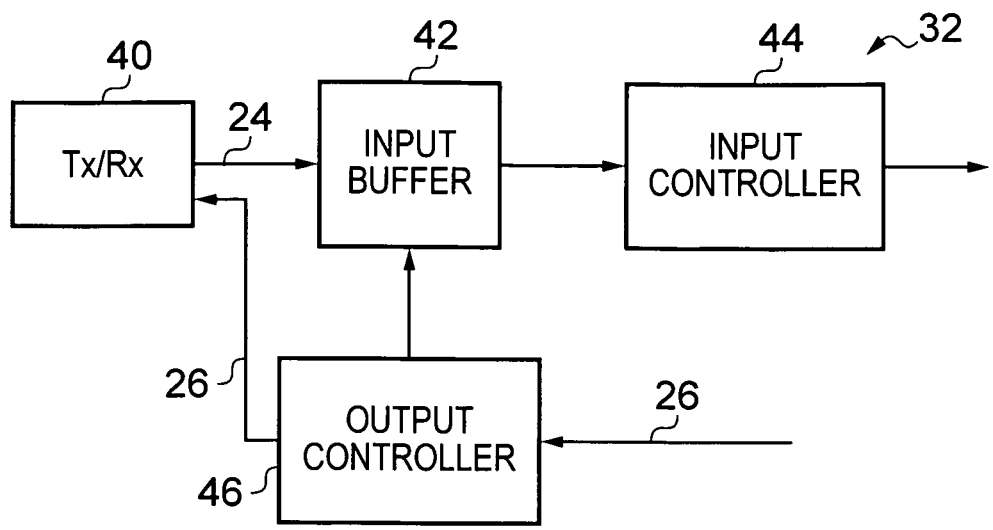
FIG. 5 illustrates an example of a communications interface in a mobile accessory apparatus.

FIG. 5 illustrates an example of a communications interface 32 in a mobile accessory apparatus 30. The communications interface 32 in this example comprises a transceiver 40 for providing physical layer communication with the communication interface 10 of a mobile user apparatus 2.

The output commands 24 from the second application 18B after receipt at the transceiver 40 are provided by the transceiver 40 to an input buffer 42 where they are temporarily stored e.g. in a first in first out register.

The input buffer 42 provides the output commands 24 to an input controller 44. The input controller 44 is configured to translate received output commands 24 of the second application 18B from a standard format to a format for controlling the integrated display 36.

The communications interface 32 in this example additionally comprises an output controller 46. The output controller 46 is configured to translate user input commands 26 from the user input circuitry 38 to a standard format before provision to the transceiver 40 for transmission to the second application 18B at the mobile user apparatus 2.

In some embodiments, the output controller 46 may intercept user input commands 26 for local operation. For example, if a user input command 26 indicates that content streamed to the display 38 should be paused, the output controller 46 instead of sending the user input command 26 to the mobile user apparatus 2 may, instead, control the input buffer 42 to store incoming output commands 24 without providing them to the input controller 44 and hence to the display 36.

The incoming output commands 24 may, for example, convey content for consumption by the different user 31A of the mobile accessory apparatus 30. The content may be time-varying content and it may be streamed via the output commands 24 of the second application 18B. As an example, the second application 18B may provide, at the mobile accessory apparatus 30A satellite navigation functionality, video gaming functionality, photo album functionality, video playback functionality or e-book functionality, multimedia functionality.

Figure 6:
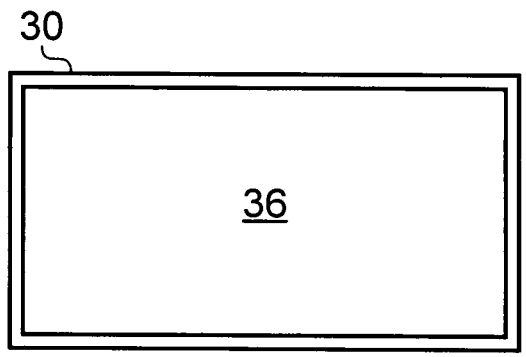
FIG. 6 illustrates from a front perspective an example of a mobile accessory apparatus.

FIG. 6 illustrates an example of a mobile accessory apparatus 30. In this example, the mobile accessory apparatus 30 is a touch screen device. The display 36 and the user input 38 are integrated in a touch screen.

The mobile accessory apparatus 30 in this example has a substantially cuboid volume. The mobile accessory apparatus 30 in this example has a substantially rectangular front face and the display 36 occupies the majority of that front face.

The display 36 has functionality that is different to the display 6 of the mobile user apparatus 2.

It may, for example, have a larger size or different aspect ratio so that it is better suited for displaying content to a user.

It may, for example, use different imaging technologies so that it has brighter colors, and/or higher contrast.

It may, for example, use different imaging technologies so that it has less contrast.

Figure 7:
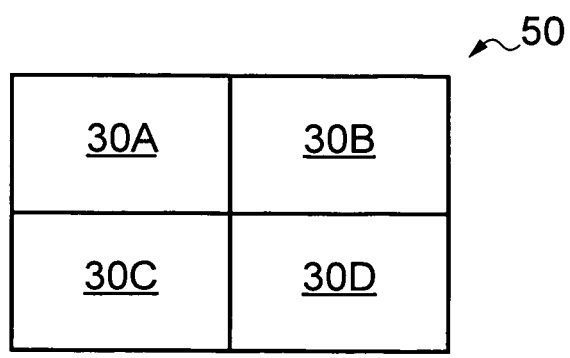
FIG. 7 illustrates an use scenario in which a plurality of mobile accessory apparatus are tessellated together to form a larger display.

FIG. 7 illustrates a use scenario in which a plurality of the mobile accessory apparatus 30 illustrated in FIG. 6 are tessellated together to form a larger display. The mobile accessory apparatus 30 are arranged side by side to form an N by M array of mobile accessory apparatus 30.

In this example, the integrated display 36 of each mobile accessory apparatus 30 comprises multiple edges. The mobile accessory apparatus 30 is configured to detect at which of the edges an additional adjacent mobile accessory apparatus is located and to inform the mobile user apparatus 2. The mobile user apparatus 2 can then provide content to each of the mobile accessory apparatus 30 so that the displays 36 of the multiple mobile accessory apparatus 30 operate as a single large display.

Figure 8:
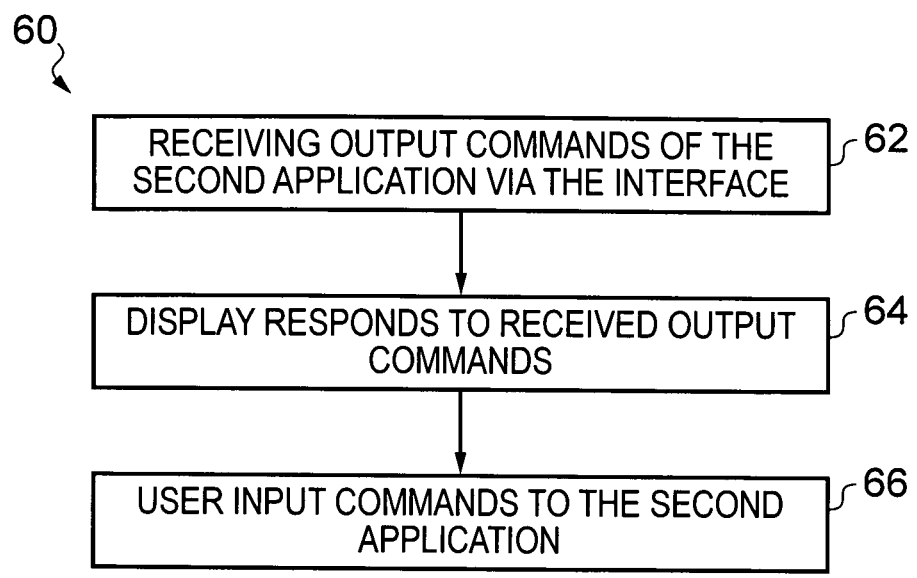
FIG. 8 illustrates a method at a mobile accessory apparatus.

FIG. 8 illustrates a method 60 performed at a mobile accessory apparatus 30.

At block 62, the mobile accessory apparatus 30 communicates with a mobile user apparatus 2 in possession of a different user 8. The mobile user apparatus 2 is configured to execute multiple applications 18 at the same time including a first application 18A and a second application 18B. The mobile accessory apparatus 30 receives output commands 24 of the second application 18B via an interface 32.

At block 64, the display 36 of the mobile accessory apparatus 30 responds to the received output commands 24 of the second application 18B.

At block 66, the mobile accessory apparatus 30 provides user input commands 26 to the second application 18B at the mobile user apparatus 2.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The blocks illustrated in the FIGS. 3 and 8 may represent steps in a method and/or sections of code in the computer program. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

Although it is described that the mobile user apparatus 2 communicates with one or more accessory apparatus in possession of one or more different users, it should be appreciated that while the mobile user apparatus is capable of communicating with one or more accessory apparatus in possession of one or more different users, the mobile user apparatus does not always have to communicating with one or more accessory apparatus in possession of one or more different users and may also be capable of communicating with one or more accessory apparatus in possession of the user of the mobile user apparatus.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A mobile user apparatus comprising:
    user output circuitry comprising an integrated display for displaying content to a user;
        an interface configured to communicate with one or more of a plurality of accessory apparatus; and
        processing circuitry configured to:
        execute multiple applications at the same time including a first application and a second application, the second application running substantially simultaneously on both the mobile user apparatus and on at least one of the plurality of accessory apparatus;
        provide output commands of the first application exclusively to the integrated display; and
        provide output commands of the second application to at least one of the plurality of accessory apparatus via the interface,
    wherein the processing circuitry of the mobile user apparatus is configured to receive an input command from at least one of the accessory apparatus which is based upon separately running at least a portion of the second application on the at least one accessory apparatus relative to running of the second application on the mobile user apparatus while preventing control by one or more of the plurality of accessory apparatus of the first application running on the mobile user apparatus.

2. A mobile user apparatus as claimed in claim 1, configured to receive input commands of the second application via the interface when the input commands relate only to operation of the second application.

3. A mobile user apparatus as claimed in claim 1, further comprising user input circuitry, wherein the processing circuitry is configured to limit control of the first application to control via the user input circuitry.

4. A mobile user apparatus as claimed in claim 1, further comprising user input circuitry, wherein the processing circuitry is configured to limit control of the mobile user apparatus to control via the user input circuitry.

5. A mobile user apparatus as claimed in claim 1, wherein the second application is an application for conveying content and a different user is a content consumer.

6. A mobile user apparatus as claimed in claim 1, wherein the second application is a navigation application, a movie application or a gaming application.

7. A mobile user apparatus as claimed in claim 1, wherein the processing circuitry is configured to:
    execute multiple applications at the same time including a first application, a second application and a third application;
    provide output commands of the first application to the integrated display;
    provide output commands of the second application to a first accessory apparatus via the interface; and
    provide output commands of the third application to a second accessory apparatus via the interface.

8. A mobile user apparatus as claimed in claim 1, wherein the interface is a standardized interface configured to provide an output in standard format and receive an input in standard format.

9. A mobile user apparatus as claimed in claim 1, wherein the interface is a wireless interface for local wireless communication.

10. A method comprising:
    executing multiple applications at the same time including a first application and a second application, both applications running on a mobile user apparatus;
    providing output commands of the first application to an integrated display of the mobile user apparatus; and
    providing output commands of the second application to a mobile accessory apparatus via an interface configured to communicate with any of a plurality of mobile accessory apparatus, the second application running substantially simultaneously on both the mobile user apparatus and the mobile accessory apparatus,
    receiving an input command from the at least one of mobile accessory apparatus which is based upon separately running at least a portion of the second application on the at least one of mobile accessory apparatus relative to running of the second application on the mobile user apparatus while preventing control by one or more of the plurality of mobile accessory apparatus of the first application running on the mobile user apparatus.

11. A mobile accessory apparatus comprising:
    an interface configured to communicate with a mobile user apparatus in possession of a different user that is configured to execute multiple applications at the same time including a first application exclusively at the mobile user apparatus and a second application running substantially simultaneously on both the mobile user apparatus and on the mobile accessory apparatus, wherein the interface is configured to receive output commands of the second application via the interface;
    user output circuitry comprising an integrated display configured to respond to the received output commands of the second application; and
    user input circuitry configured to provide user input commands to the second application at the mobile user apparatus via the interface,
    wherein the user input circuitry is configured to provide an input command from the mobile accessory apparatus which is based upon separately running at least a portion of the second application on the mobile accessory apparatus relative to running of the second application on the mobile user apparatus while preventing control by the mobile accessory apparatus of the first application running on the mobile user apparatus.

12. A mobile accessory apparatus as claimed in claim 11, wherein the mobile accessory apparatus is configured to operate only as a consequence of communication with a mobile user apparatus.

13. A mobile accessory apparatus as claimed in claim 11, wherein the mobile accessory apparatus is configured to provide output relating to the second application only while in communication with a mobile user apparatus.

14. A mobile accessory apparatus as claimed in claim 11, wherein the mobile accessory apparatus is configured to operate as a slave to the mobile user apparatus.

15. A mobile accessory apparatus as claimed in claim 11, wherein the mobile accessory apparatus has limited processing capability compared to the mobile user apparatus.

16. A mobile accessory apparatus as claimed in claim 11, wherein the interface is configured to translate user input from the user input circuitry to a standard format before provision to the second application at the mobile user apparatus and
wherein the interface is configured to translate received output commands of the second application from a standard format to a format for controlling the integrated display.

17. A mobile accessory apparatus as claimed in claim 11, wherein the integrated display comprises multiple edges and wherein the mobile accessory apparatus is configured to detect at which of the edges an additional mobile accessory apparatus is located and to inform the mobile user apparatus.

18. A method comprising:
at a mobile accessory apparatus, communicating with a mobile user apparatus in possession of a different user that is configured to execute multiple applications at the same time including a first application exclusively at the mobile user apparatus and a second application, the second application running substantially simultaneously on both the mobile user apparatus and on the mobile accessory apparatus,
at the mobile accessory apparatus, receiving output commands of the second application via an interface;
at the mobile accessory apparatus, responding to the received output commands of the second application; and
at the mobile accessory apparatus, providing user input commands to the second application at the mobile user apparatus,
wherein providing user input commands is limited to providing user input commands for only a current application at the mobile user apparatus via the interface, of the mobile user apparatus is configured to receive an input command from at least one of the accessory apparatus which is based upon separately running at least a portion of the second application on the at least one accessory apparatus relative to running of the second application on the mobile user apparatus while preventing control by one or more of the plurality of accessory apparatus of the first application running on the mobile user apparatus.

19. A system comprising:
a mobile user apparatus in possession of a user;
a first accessory apparatus in possession of a first different user; and a second accessory apparatus in possession of a second different user
wherein the mobile user apparatus comprises:
user output circuitry comprising an integrated display for displaying content to a user;
an interface configured to communicate with the first accessory apparatus in possession of the first different user and configured to communicate with the second accessory apparatus in possession of the second different user;
processing circuitry configured to:
execute multiple applications at the same time including a first application, a second application and a third application, the second application running substantially simultaneously on both the mobile user apparatus and on the first accessory apparatus in possession of the first different user and the third application running substantially simultaneously on both the mobile user apparatus and on the second accessory apparatus in possession of the second different user;
provide output commands of the first application to the integrated display; and
provide output commands of the second application to the first accessory apparatus in possession of the first different user via the interface; and
provide output commands of the third application to a second accessory apparatus in possession of the second different user via the interface,
wherein the processing circuitry is configured to limit control provided to the first different user to control of aspects of the second application only;
wherein the first mobile accessory apparatus comprises:
an interface configured to communicate with the mobile user apparatus and receive output commands of the second application from the mobile user apparatus;
user output circuitry comprising an integrated display configured to respond to the received output commands of the second application; and
user input circuitry configured to provide user input commands to the second application at the mobile user apparatus via the interface;
wherein the second mobile accessory apparatus comprises:
an interface configured to communicate with the mobile user apparatus and receive output commands of the third application from the mobile user apparatus;
user output circuitry comprising an integrated display configured to respond to the received output commands of the third application; and
user input circuitry configured to provide user input commands to the third application at the mobile user apparatus via the interface of the mobile user apparatus is configured to receive an input command from at least one of the accessory apparatus which is based upon separately running at least a portion of the second application on the at least one accessory apparatus relative to running of the second application on the mobile user apparatus while preventing control by one or more of the plurality of accessory apparatus of the first application running on the mobile user apparatus.

* * * * *